United States Patent [19]

Takahashi

[11] Patent Number: 4,533,924

[45] Date of Patent: Aug. 6, 1985

[54] MECHANISM FOR SELECTING PEN IN AN X-Y PLOTTER

[75] Inventor: Shunetsu Takahashi, Shiojiri, Japan

[73] Assignee: Epson Corporation, Tokyo, Japan

[21] Appl. No.: 530,139

[22] Filed: Sep. 7, 1983

[30] Foreign Application Priority Data

Sep. 9, 1982 [JP] Japan .............................. 57-156934

[51] Int. Cl.³ .................. G01D 9/28; G01D 15/16
[52] U.S. Cl. .................... 346/49; 346/139 R
[58] Field of Search ........ 346/139 R, 139 A, 139 B, 346/139 C, 141, 49, 46

[56] References Cited

U.S. PATENT DOCUMENTS 4,097,874 6/1978 Anderka .......................... 346/141
4,157,552 6/1979 Nakajima ........................ 346/141
4,405,931 9/1983 Fujisawa ........................ 346/139 R Primary Examiner—E. A. Goldberg
Assistant Examiner—Mark Reinhart
Attorney, Agent, or Firm—Blum Kaplan Friedman Silberman & Beran

[57] ABSTRACT

A pen changer for use in an X-Y plotter which plots on a paper. The pen changer includes a frame and a shaft supported thereon. The carriage is supported on the shaft and guided thereby. The carriage includes a plurality of recording pens. The pen changer includes a frame and a shaft supported thereon. The carriage is supported on the shaft and guided thereby. The carriage includes a plurality of recording pens arranged along the axial direction of the shaft. The carriage moves essentially perpendicular to the paper. A hammer is axially movable on the shaft in response to movement of the carriage. A changing mechanism positions the hammer with respect to a selected one of the plurality of recording pens so the hammer can select the selected recording pen to plot on the paper.

8 Claims, 24 Drawing Figures

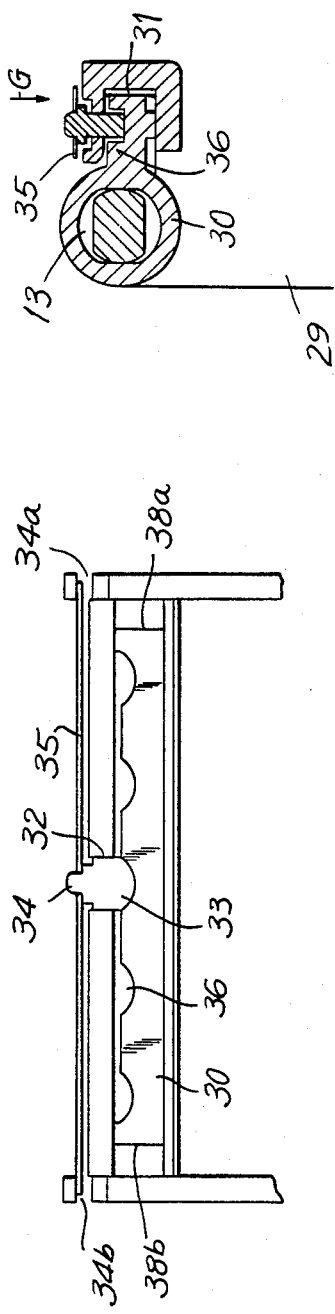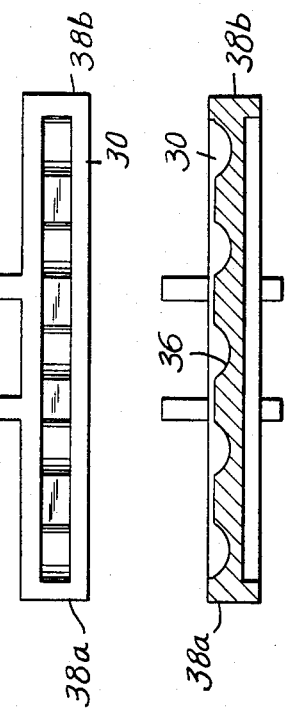
FIG.5A FIG.5B FIG.6A FIG.6B 4,533,924

MECHANISM FOR SELECTING PEN IN AN X-Y PLOTTER

BACKGROUND OF THE INVENTION

The present invention is directed to an X-Y plotter having a pen changer, and, in particular, to a pen charger for an X-Y plotter which is simple in construction and quickly operable for permitting fast and easy changing of pens.

As shown in FIGS. 12A and 12B of the drawings, a conventional X-Y plotter, generally indicated as 200, includes a plurality of pens 1, individually identified as 1a, 1b, 1c, 1d, a rotatable holder 2 supporting pens 1, a carriage 3 slidable on rods 3a and carrying rotatable holder 2, a pen return spring 4 fixed to holder 2, a hammer 6 with a slide roller 5, and a drive plate 7 for actuating hammer 6. When a solenoid is energized to produce an attractive or repulsive force, drive plate 7 is angularly moved in the direction of arrow A to move slide roller 5 in the same direction. Hammer 6 is then turned in the direction of arrow B to thereby cause pen 1a to slide in the direction of arrow C until it is pressed against a sheet of paper.

When pens are to be changed in this prior art structure, carriage 3 must be physically moved to one of the side walls of the plotter frame to enable a leaf spring 8 fixed to the side wall to turn teeth or notches 9 on the periphery of holder 2 one notch at a time in the direction of arrow D. A desired pen 1 is thus brought into and kept in a print position by a rotation stop leaf spring 10 and an inner indexing mechanism (not shown).

The prior art pen changer in X-Y plotters is disadvantageous in that the carriage has to be reciprocably moved toward and away from the side wall to turn holder 2 the required number of notches or teeth until a desired pen is reached. A sensor is required to be installed between the holder and the side wall for detecting pen numbers. After the X-Y plotter has been used, the pen should be removed and covered with caps which places a limitation on the use of the plotter.

Accordingly, the present invention provides an improved pen changer for use in X-Y plotters which overcomes the disadvantages of the prior art.

SUMMARY OF THE INVENTION

Generally speaking, in accordance with the present invention, a pen changer for use in an X-Y plotter which plots or prints on a recording paper, is provided. The pen changer includes a frame having a shaft supported thereon. A carriage is supported on the shaft and guided therealong. The carriage includes a plurality of recording pens arranged along the axial direction of the shaft. The carriage moves essentially perpendicular to the paper. A hammer is axially movable on the shaft in response to movement of the carriage. A changing mechanism positions the hammer with respect to a selected one of the plurality of recording pens so that the hammer can select the selected recording pen to plot on the paper.

In one embodiment, the changing mechanism includes fixed members secured to the frame, and a hammer slider slidable on the shaft and guiding the hammer. The hammer slider is brought into abutment with one of the fixed members when the carriage is moved along the shaft outside of the plotable area of the paper. As a result, the hammer is moved by the hammer slider to face a selected one of the recording pens. In another embodiment, the changing mechanism includes fixed members secured to the frame. The hammer, which is sandwiched by a flange, is brought into abutment with one of the fixed members when the carriage is moved along the shaft outside of the plotable area of the paper. As a result, the hammer is moved to face a selected one of the recording pens. In still another embodiment, the changing mechanism includes the hammer slider slidable on the shaft and guiding the hammer. The hammer slider is brought into abutment with the frame when the carriage is moved along the shaft outside of the plotable area of the paper. As a result, the hammer is moved by the hammer slider to face a selected one of the recording pens.

Also disclosed is a cap lever which caps the plurality of recording pens when the carriage is moved to a home position out of the plotable area of the recording paper.

Accordingly, it is an object of the present invention to provide an improved pen changer for use in X-Y plotters.

Another object of the present invention is to provide a pen changer for use in X-Y plotters which is simple in construction and quickly operable for changing pens.

A further object of the present invention is to provide an improved pen changer for an X-Y plotter in which a plurality of recording pens are arranged in the axial direction of a shaft which guides a carriage in the plotter.

Still other objects and advantages of the invention will in part be obvious and will in part be apparent from the specification. The invention accordingly comprises the features of construction, combination of elements, and arrangement of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which:

FIGS. 5A and 5B are top plan and partial side elevational views to explain the operation of a hammer moving mechanism;

FIG. 6A and 6B are top plan and side elevational views, respectively, of a slider;

DESCRIPTION OF THE PREFERRED EMBODIMENTS

Figure 1:
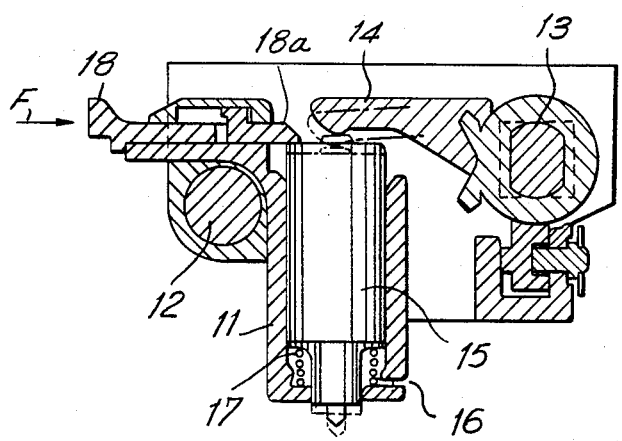
FIG. 1 is a sectional side elevational view of a carriage having a pen changer for use in an X-Y plotter constructed in accordance with a first embodiment of the present invention.
Figure 2:
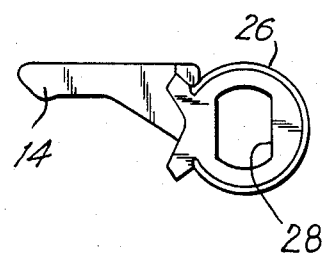
FIG. 2 is an elevational view of a hammer mechanism used in the pen changer depicted in FIG. 1.
Figure 3A:
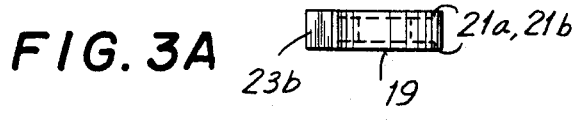
FIGS. 3A and 3B are top plan and side elevational views, respectively, of a hammer ring.
Figure 4A:
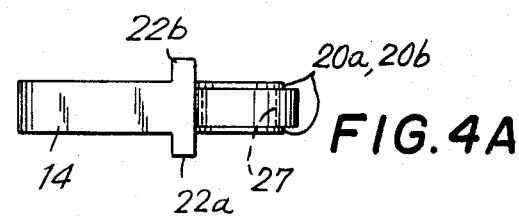
FIGS. 4A and 4B are top plan and side elevational views of a hammer.
Figure 3B:
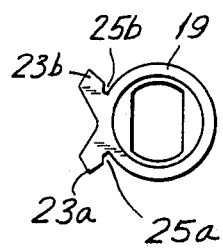
Figure 4B:
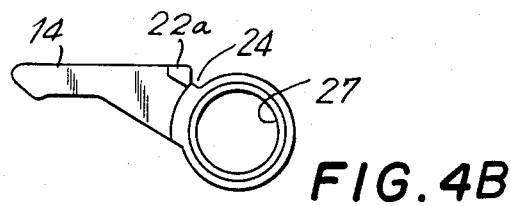

Reference is first made to FIG. 1 which depicts a carriage 11 incorporating therein a pen changer for X-Y plotters constructed in accordance with the present invention. Carriage 11, as it travels, is guided along a guide rod 12. A hammer rod 13 serves to limit rotational movement of carriage 11 and has a noncircular cross section which is fitted in a hammer 14. When hammer rod 13 is rotated about its own axis, hammer 14 is operated. Guide rod 12 is secured to fixed side members on a frame of the X-Y plotter. Hammer rod 13 is supported for rotation about its own axis and is angularly movable by a solenoid (not shown) fixedly mounted on one of the fixed side members of the X-Y plotter.

Hammer 14 is normally positioned as depicted by the solid lines in FIG. 1. When actuated, hammer 14 is brought to the position depicted in phantom in FIG. 1. A pen 15 as pushed by hammer 14 is lowered to the position shown in phantom in FIG. 1 against the force from a pen lifter spring 17 which has one end fitted in a slit 16 defined in carriage 11 so as to be prevented from being accidentally removed.

When pens are taken into or out of carriage 11, a cover 18 is moved. Cover 18 is normally urged by a spring to move in the direction of arrow F so that cover 18 is positioned in overlapping relation to pens 15 at an end 18a thereof.

Referring now to FIGS. 2, 3A, 3B, 4A and 4B, it is seen that hammer 14 is sandwiched between hammer rings 19 and rotatable about an axis through interfitting portions 20a, 20b, 21a and 21b. Projections 22a and 22b of hammer 14 and projections 23a and 23b of hammer rings 19 coact to prevent hammer 14 from rotating in one direction. Hammer 14 has a recess 24, and hammer rings 19 have recesses 25a and 25b. A hammer spring 26 has ends fitted in recess 24 and recess 25a or 25b for taking up an excessive stroke of hammer 14 to bring projections 22a, 22b and 23a or 23b into pressing engagement with each other so that hammer 14 will be rotatable in one direction when a torque is applied. Hammer 14 has a circular shaft hole 27, and hammer ring 19 has a hole 28 complementary in shape to the noncircular cross section of hammer rod 13 (FIG. 1). The torque of hammer rod 13 is transmitted to hammer rings 19, and a certain amount of the transmitted torque is delivered through hammer spring 26 to hammer 14 while the remainder of the torque is dissipated as hammer spring 26 is elastically deformed.

Referring to FIGS. 5A, 5B, 6A and 6B it is seen that a hammer moving mechanism 29 is sandwiched by a slidable hammer slider 30 with hammer rod 13 in coaxial relation, and fitted in a slot 31 defined in carriage 11 for axial movement. A slider pin 33 is fitted in a hole 32 defined in carriage 11 and urged in the direction of arrow G by a slider spring 35 held in rectangular holes 34a and 34b in side surfaces of carriage 11 and by a projecting top 34 of slider pin 33 so that slider pin 33 is pressed against a pen changing indexing surface 36 defined on the back of hammer slider 30 as a continuous corrugated groove, which prevents hammer slider 30 from dropping off prior to insertion of hammer rod 12 through carriage 11.

Figure 7A:
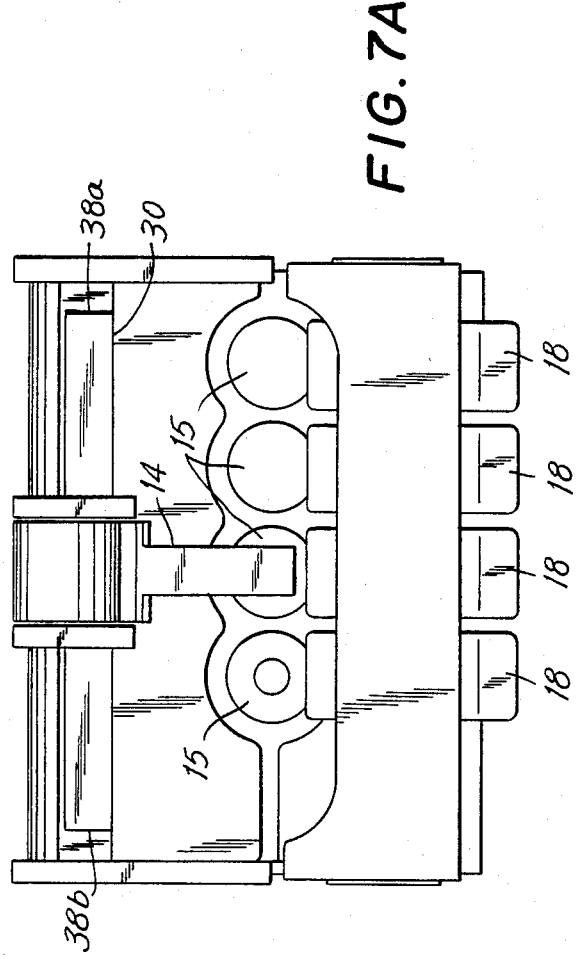
FIG. 7A and 7B are top plan and side elevational views, respectively, of a carriage.
Figure 7C:
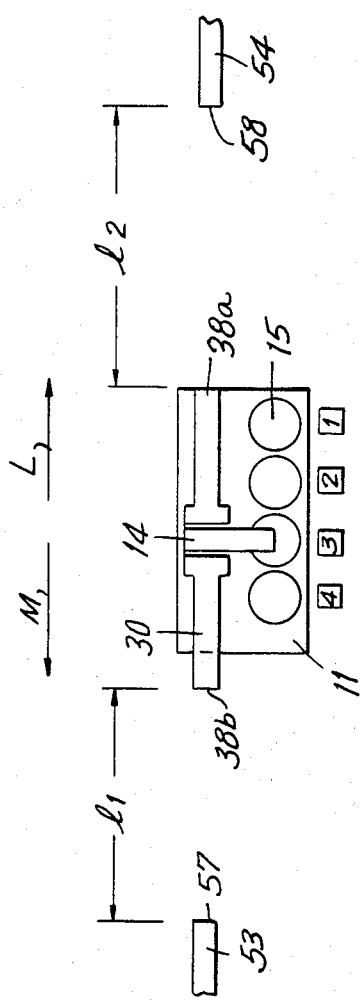
FIG. 7C is an explanatory diagram for use in explaining the pen changing operation.
Figure 7B:
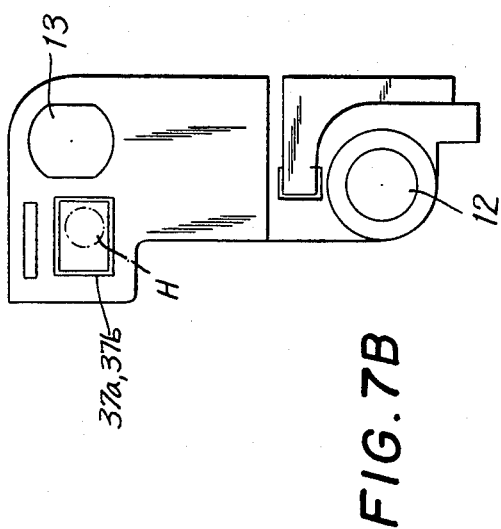

Reference is now made to FIGS. 7A and 7B. For changing pens, as described below, a fixed member is inserted loosely through rectangular holes 37a and 37b defined in the side surfaces of carriage 11 until the fixed member strikes the carriage in the position indicated by H.

Figure 11A:
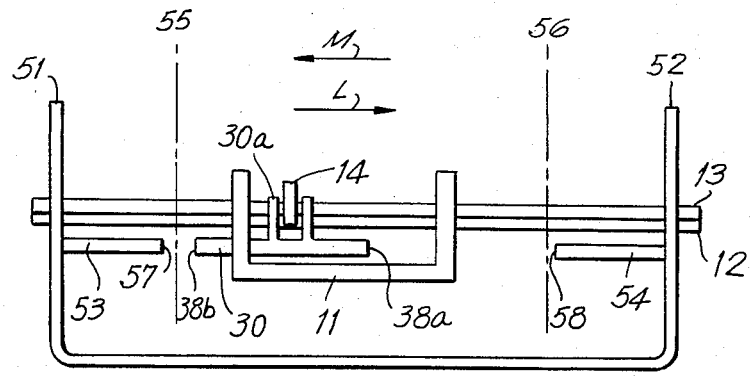
FIG. 11A is an explanatory diagram for explaining the pen changing operation in accordance with one embodiment of the present invention.

FIG. 11A is a schematic diagram showing the pen changing operation in accordance with one embodiment of the present invention. The X-Y plotter has lateral side walls 51 and 52 with fixed members 53 and 54 secured thereto, respectively, in the directions of sliding movement of hammer slider 30. Designated at 55 and 56 are limits of a range in which hammer slider 30 is moved while carriage 11 is in a plotting zone. Fixed members 53 and 54 have distal ends 57 and 58, respectively, positioned outside of the limits 55 and 56. When hammer 14 is to be moved in the direction of arrow L with respect to carriage 11 for changing pens, carriage 11 is slid in the direction of arrow M toward the distal end 57 of fixed member 53. The end surface of hammer slider 30 which faces fixed member 53 strikes fixed member 53 at a certain point in time. Continued sliding movement of carriage 11 in the direction of arrow M causes hammer slider 30 to slide in the direction of arrow L with respect to carriage 11. This allows hammer 14 sandwiched by slider 30 to be moved in the direction of arrow L with respect to carriage 11. Hammer 14 now selects a new pen and press the pen against a sheet of paper.

When hammer 14 is to be moved in the direction of arrow M with respect to carriage 11, carriage 11 is slid in the direction of arrow L. The foregoing operation can be performed simply by controlling carriage 11 to be spaced a certain distance in the plotting zone from the lateral side walls 51 and 52 for changing pens.

Figure 11B:
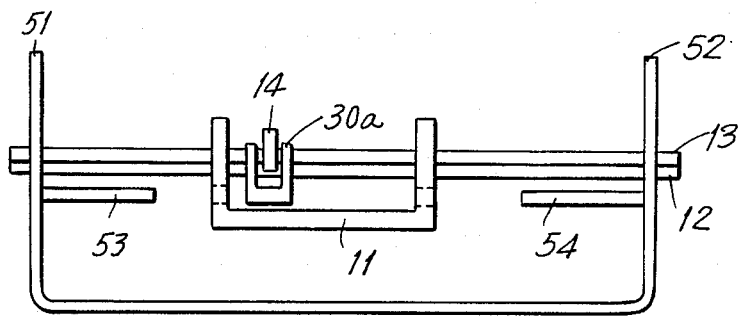
FIGS. 11B and 11C are explanatory diagrams for explaining the pen changing operation in accordance with other embodiments of the present invention.

FIG. 11B is a schematic diagram showing the pen changing operation in accordance with another embodiment of the present invention. Fixed members 53 and 54 are secured to the lateral side walls 51 and 52, respectively. Hammer 14 has only flange 30a connected thereto. When hammer 14 is to be moved in the direction of arrow L with respect to carriage 11 for changing pens, carriage 11 is slid in the direction of arrow M toward fixed member 53. The sliding movement of carriage 11 causes flange 30a to strike fixed member 53 which has entered carriage 11. This allows hammer 14 sandwiched by flange 30a to be moved in the direction of arrow L with respect to carriage 11. Hammer 14 now selects a new pen and presses the pen against a sheet of paper.

When hammer 14 is to be moved in the direction of arrow M with respect to carriage 11 for changing pens, carriage 11 is slid in the direction of arrow L toward fixed member 54. The sliding movement of carriage 11 causes flange 30a to strike fixed member 54 which has entered carriage 11. This allows hammer 14 to be moved in the direction of arrow M.

Figure 11C:
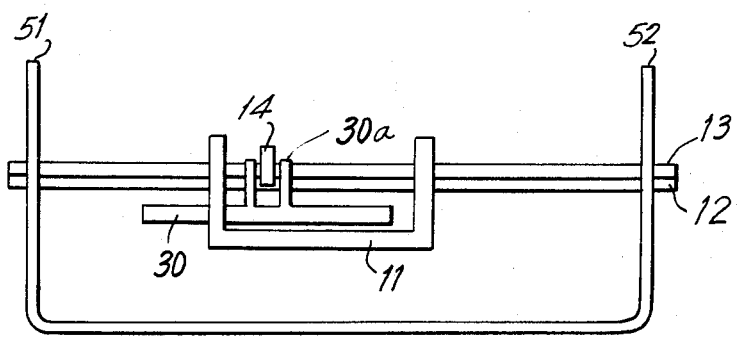
Figure 12B:
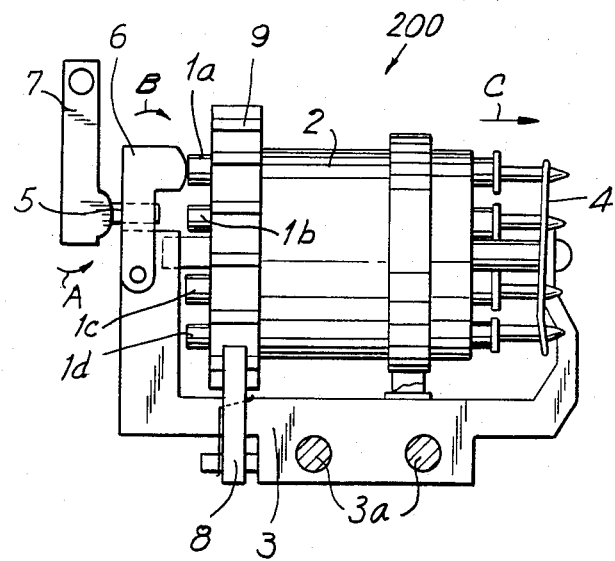
FIGS. 12A and 12B are views of pen changers for use in plotters constructed in accordance with the prior art.
Figure 12A:
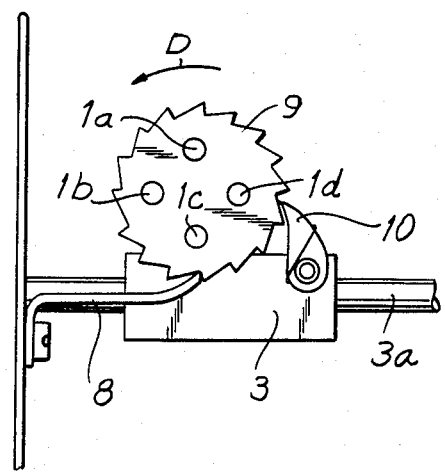

FIG. 11C is a schematic diagram showing the pen changing operation in accordance with still another embodiment of the present invention. In this embodiment, hammer slider 30 is connected to hammer 14 and there is no fixed member. Sliding movement of carriage 11 in the direction of arrow M or L causes hammer slider 30 to strike the lateral side wall 51 or 52, respectively. As a result, hammer slider 30 with hammer 14 sandwiched thereby is moved in the direction of arrow L or M, respectively.

There is no need for power and an electric circuit solely for that pen changing operation, but only an electric circuit should be provided which has a memory and arithmetic logic for causing the carriage to slide a required distance in a desired direction, and providing an offset dependent on the distance between central axes of the changed pens. Such an electric circuit can be included in the electric circuit provided for enabling the pen to plot a desired pattern.

FIG. 7C is a diagram schematically showing the manner in which pens on the carriage are changed. During operation, an electric circuit for effecting arithmetic operations and control is capable at all times of recognizing the pen position as it plots a pattern. Such pen position recognition means that the electric circuit recognizes a distance $l_1$ from a lefthand end surface 38b (as shown) of hammer slider 30 to a righthand end surface 57 (as shown) of fixed member 53, and a distance $l_2$ from a righthand end surface 38a of hammer slider 30 to a lefthand end surface 58 of fixed member 54. Assuming that the pens mounted on carriage 11 are assigned pen numbers 1 through 4 in the order in which they are arranged, $$J = |N_1 - N_2| \times P,$$

where
P: the distance between the pens;
$N_1$: the pen number of the pen currently selected;
$N_2$: the pen number of the pen to be selected next; and
J: the distance, i.e. offset, between the pens $N_1a$ and $N_2$.

Therefore, when $J>0$ and the pen changing is performed in the direction of pen numbers 4 to 1, carriage 11 is moved by the distance $(l_1+J)$ in the direction of arrow M to return for the distance $l_1$. When $J>0$ and the pen changing is performed in the direction of pen numbers 1 to 4, carriage 11 is moved by the distance $(l_2+J)$ in the direction of arrow L to return for the distance $l_2$.

When $J=0$, carriage 11 should remain positioned where it is.

Through the foregoing control operation, a desired pen can be selected simply by giving the number of the pen desired.

Figure 8A:
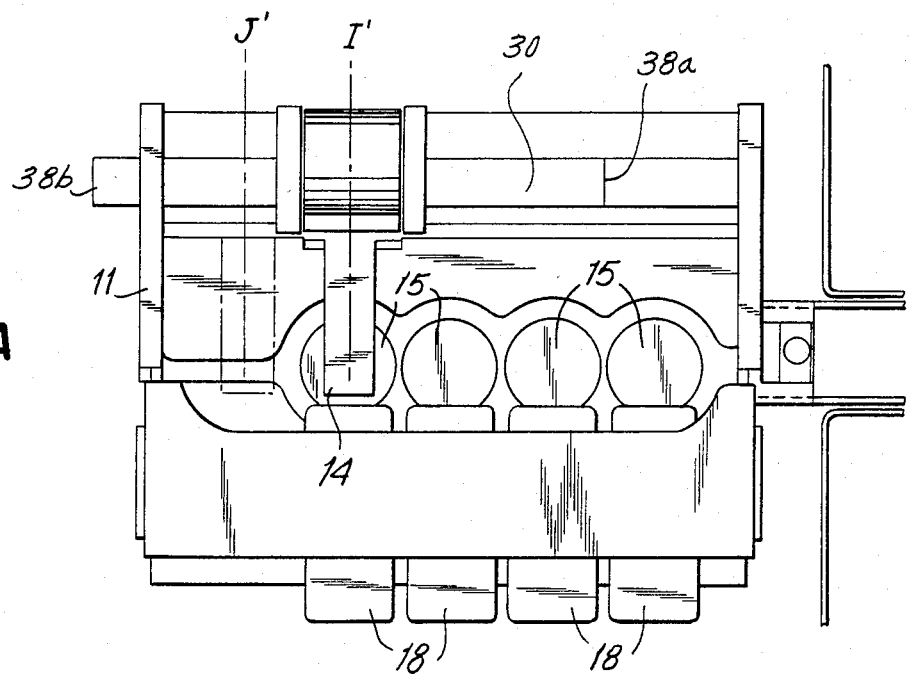
FIGS. 8A and 8B are top plan and side elevational views depicting an automatic cap closing mechanism constructed in accordance with the present invention.
Figure 8B:
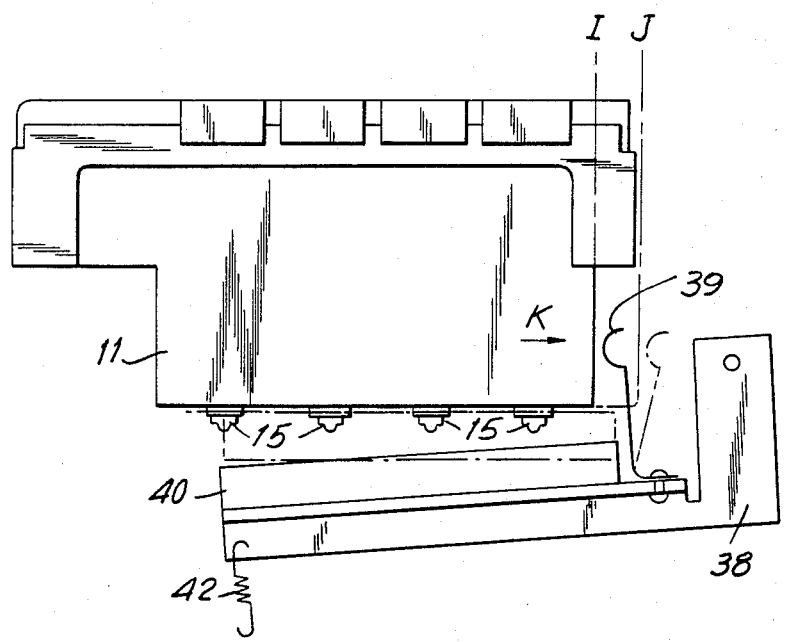

Reference is now made to FIGS. 8A and 8B which depict an automatic cover closing mechanism. When carriage 11 is moved from the position I to the position J, hammer 14 moves from the position I' to the position J'. There is no pen in the position J', and hence pens can be changed without being disturbed by the hammer by moving hammer 14 to the position J'. When carriage 11 is moved from the position I to the position J, it pushes a leaf spring 39 in the direction of arrow K, leaf spring 39 being fixed to a cap lever 38 angularly movably supported on the frame. Cap lever 38 has a pen cap 40 preferably made of rubber fixed to one end thereof and facing the group of pens. Pen cap 40 serves to prevent the pens from drying out by covering the balls at the tip end of the pens and the air vents 41a, 41b and 41c (FIG. 9B) defined adjacent to the pen tip ends.

Figure 9A:
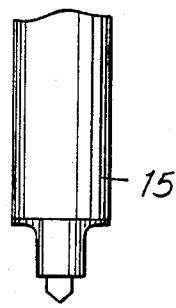
FIGS. 9A and 9B are side elevational and bottom plan views, respectively, of a pen.
Figure 9B:
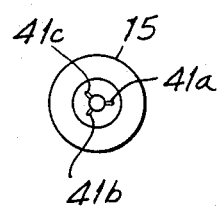

FIG. 9A is a plan view of pen 15, and FIG. 9B is a front elevational view of pen 15. Lever 38 (FIG. 8B) is normally urged by a return spring 42 (FIG. 8B) to move away from the pens when carriage 11 is located in positions outside of the range between the positions I and J.

Figure 10A:
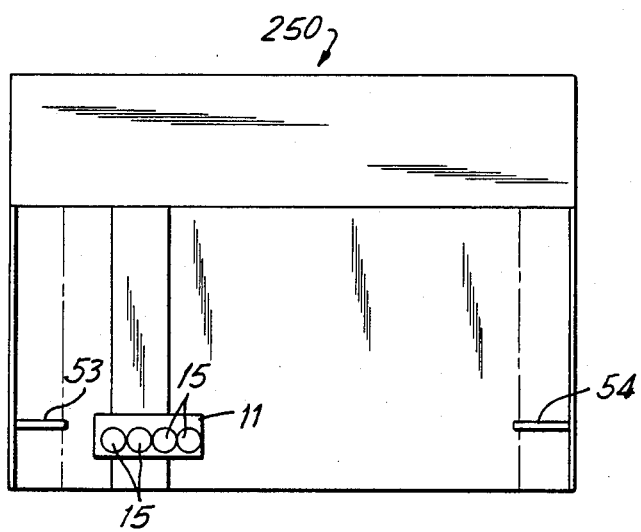
FIGS. 10A and 10B depict pen changers for X-Y plotters constructed in accordance with alternative embodiments of the present invention.
Figure 10B:
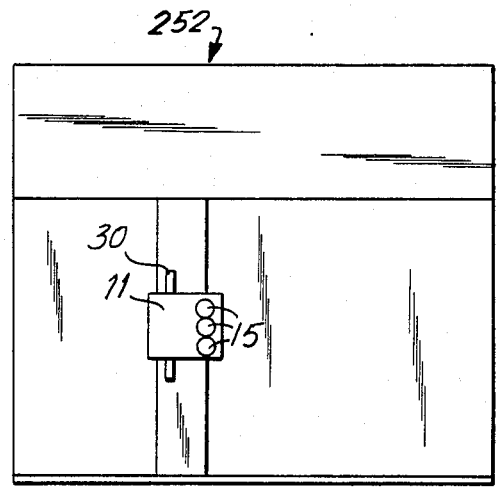

FIGS. 10A and 10B depict applications in which a pen changer for an X-Y plotter according to the present invention is employed. FIG. 10A illustrates a flatbed type X-Y plotter generally indicated at 250 in which pens 15 are arranged laterally, and FIG. 10B depicts an X-Y plotter generally indicated at 252 in which pens 15 are arranged vertically to a lateral direction.

With the present invention, as described above, the carriage is located in the home position with a particular pen (assigned the number 1 in FIG. 7C) selected when the plotter is switched on. When pens are to be changed, no pen sensor is required, but the carriage is moved and operated to complete the pen changing operation. With a pen-zero command, the pen tips are automatically covered by the pen cap while the hammer position is being displaced to allow pens to be replaced. The foregoing operations can be accomplished highly reliably with a simple construction in accordance with the present invention.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

I claim:

1. A pen selection mechanism for selecting a desired pen in an X-Y plotter which plots on a paper comprising first and second opposed side frames, a shaft supported intermediate said first and second side frames which extends essentially perpendicular thereto, a carriage supported on said shaft and guided thereby, said carriage including a plurality of recording pens arranged in a line along the axial direction of said shaft, said carriage moving essentially perpendicular to said paper, a hammer axially movable along said shaft in response to movement of said carriage, and changing means for moving said hammer in a direction opposite to movement of said carriage during and in response to a single movement of said carriage towards one of said first and second side frames for positioning said hammer with respect to a selected one of said plurality of recording pens so that said hammer can select said selected recording pen upon said single movement of said carriage to plot on said paper.

2. The pen selection mechanism as claimed in claim 1, wherein said changing means includes first and second fixed members secured respectively to said first and second side frames, said hammer being sandwiched by a flange, said flange being brought into abutment with one of said first and second fixed members when said carriage is moved along said shaft outside of the plotable area of said paper, whereby said hammer is moved to face a selected one of said recording pens.

3. The pen selection mechanism as claimed in claim 1, wherein said changing means includes a hammer slider slidable on said shaft and guiding said hammer, said hammer slider being brought into abutment with one of said first and second side frames when said carriage is moved along said shaft outside of the plotable area of said paper, whereby said hammer is moved to face a selected one of said recording pens.

4. The pen selection mechanism as claimed in claim 1, wherein said shaft has a noncircular cross-section and is angularly movable, said hammer being actuatable in response to the angular movement of said shaft to press a selected recording pen against said paper.

5. A pen selection mechanism as claimed in claim 1, wherein said hammer is slid along said shaft by said changing means to face a selected recording pen.

6. The pen selection mechanism as claimed in claim 4, wherein said hammer is angularly movable in response to angular movement of said shaft.

7. The pen selection mechanism as claimed in claim 1, further comprising a cap lever having a plurality of pen caps pivotally coupled to said frame, said cap lever being angularly movable for capping said recording pens when said carriage is out of said plotable area in a home position.

8. The pen selection mechanism as claimed in claim 1, wherein said changing means includes first and second fixed members respectively secured to said first and second side frames, and a hammer slider slidable on said shaft and guiding said hammer, said hammer slider being brought into abutment with one of said first and second fixed members when said carriage is moved along said shaft outside of the plotable area of said paper, whereby said hammer is moved to face a selected one of said recording pens.

* * * * *